May 28, 1968 R. M. ROWND ET AL 3,384,923
APPARATUS FOR MAKING PLASTIC LINED VACUUM BOTTLE FILLERS
Original Filed March 13, 1964 3 Sheets-Sheet 1
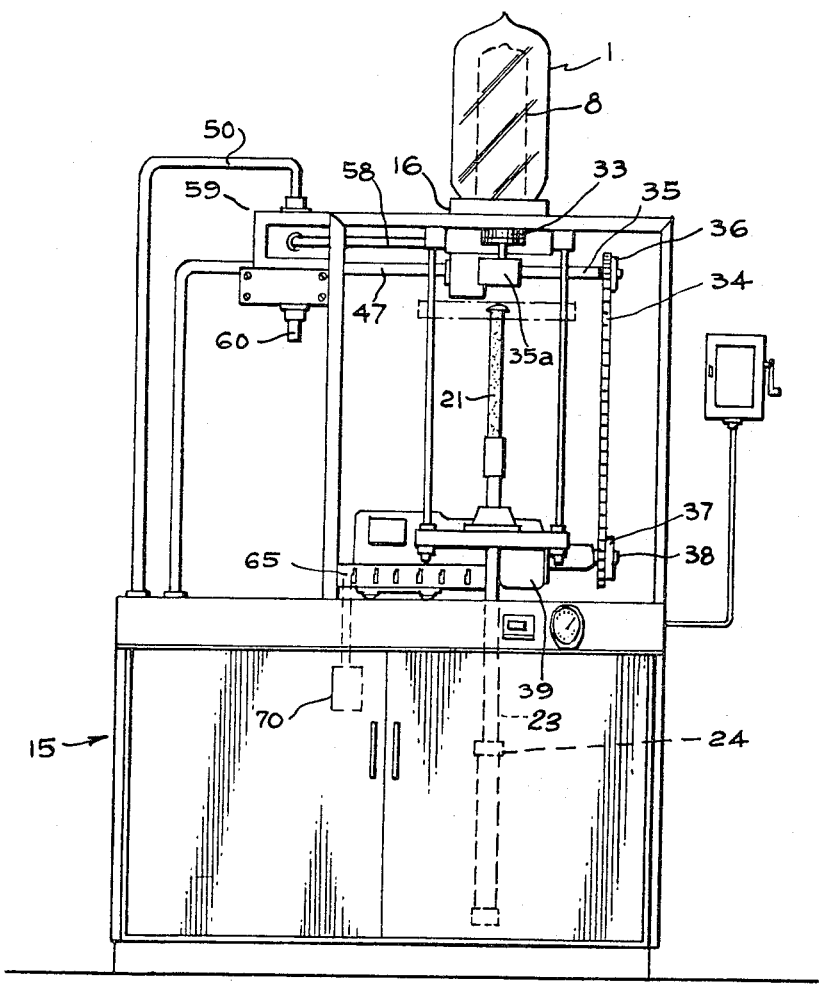
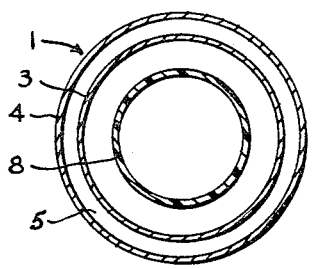
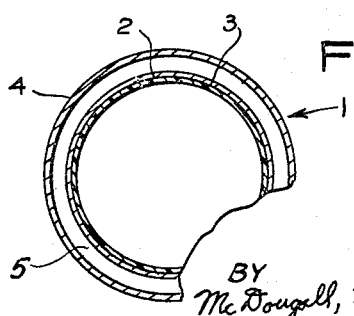
INVENTORS
ROBERT M. ROWND
THOMAS H. PETTY
BY McDougall, Hersh, Scott & Ladd
ATTORNEYS

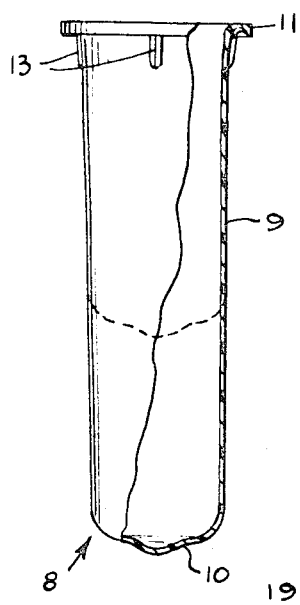
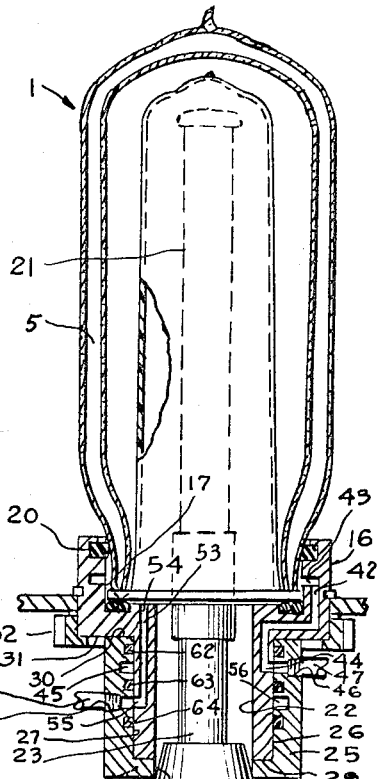
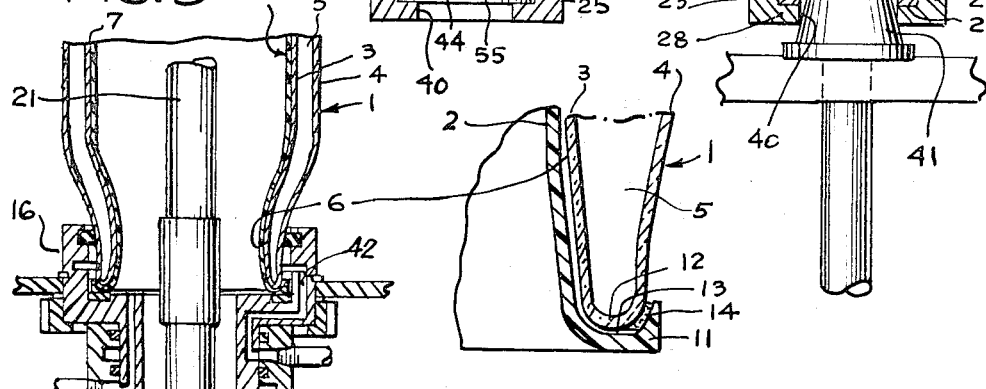
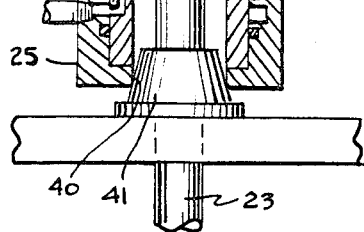

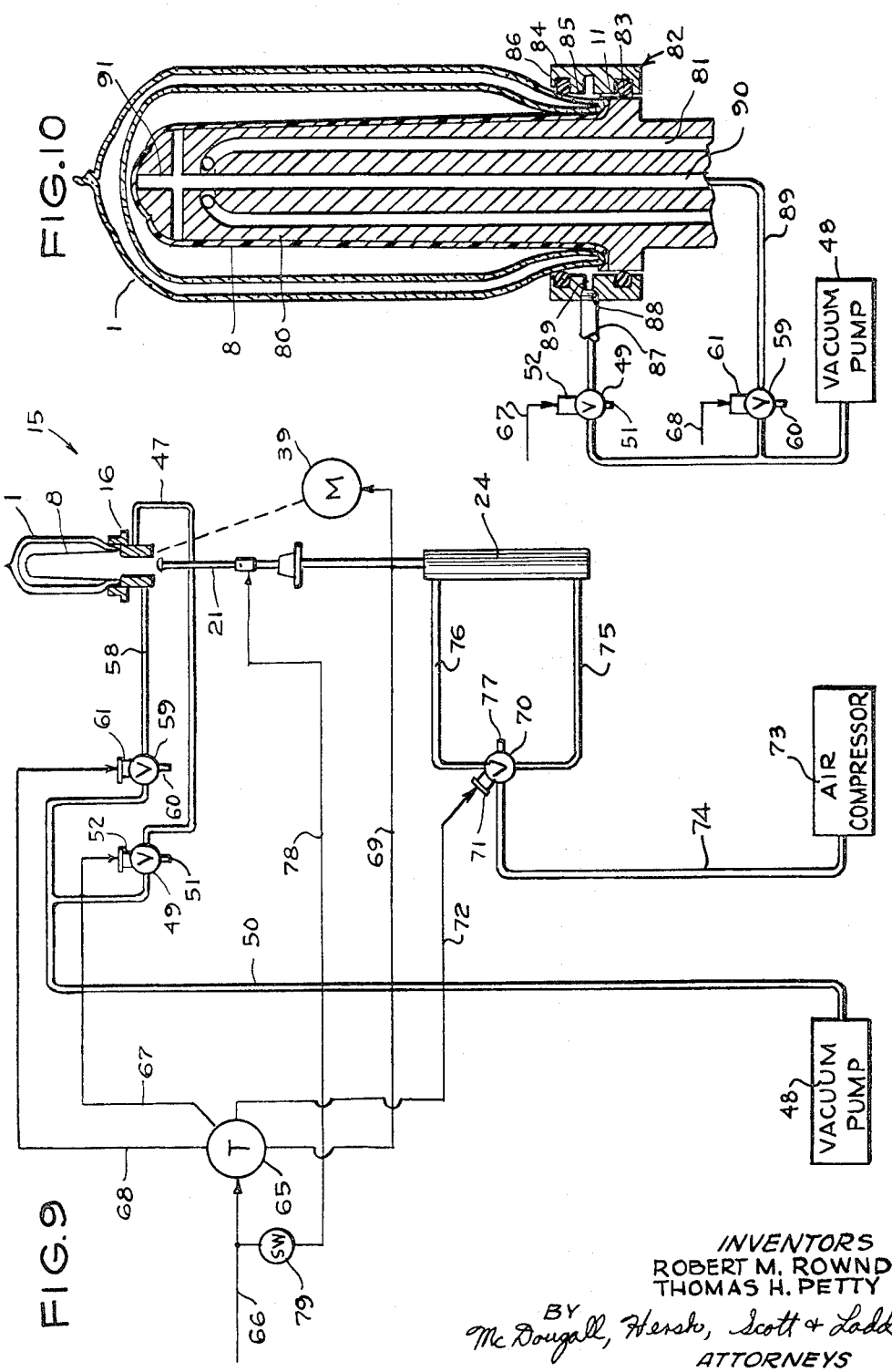

United States Patent Office 3,384,923
Patented May 28, 1968

3,384,923
APPARATUS FOR MAKING PLASTIC LINED
VACUUM BOTTLE FILLERS
Robert M. Rownd and Thomas H. Petty, Nashville, Tenn., assignors to Aladdin Industries, Incorporated, Chicago, Ill., a corporation of Illinois
Original application Mar. 13, 1964, Ser. No. 351,753. Divided and this application June 30, 1967, Ser. No. 650,284
5 Claims. (Cl. 18—5)

ABSTRACT OF THE DISCLOSURE

A machine for expanding a plastic liner into a vacuum bottle filler or the like having a reduced neck, comprising a rotatable head for receiving the unexpanded liner and the filler, power means for rotating the head, first evacuating means including first passages in the head for evacuating the space between the liner and the filler, second evacuating means including second passages in the head for evacuating the space within the liner, a heater movable by power means into the liner, and control means for actuating said first and second evacuating means, actuating said heater, terminating the actuation of said second evacuating means for admitting fluid pressure to the space within the liner to expand the liner, withdrawing the heater, and terminating the action of said first evacuating means.

This application is a division of our copending application, Ser. No. 351,753, filed Mar. 13, 1964 and now abandoned.

This invention relates to the manufacture of plastic lined fillers for vacuum bottles. Such fillers are normally made of glass and are vacuum insulated by being provided with double walls having an evacuated space therebetween. While the present invention is particularly advantageous for use in connection with fillers for vacuum bottles, the invention is also applicable to a large extent to the production of plastic lined bottles generally.

The present invention deals with the problem of producing a vacuum insulated filler for a vacuum bottle, having a mouth of reduced size, and provided with a protective liner made of resinous plastic material. Such a liner cannot simply be inserted into the vacuum insulated filler, but must be expanded into the filler. To deal with this problem, the present invention provides an apparatus or machine comprising a head which preferably is rotated by power means. The head is adapted to receive the unexpanded liner blank. The vacuum insulated filler is then mounted on the head, around the liner. First and second means are preferably provided to evacuate the space between the liner and the filler, and also the space within the liner. Such first and second means comprise separate passages in the head. A heater is preferably arranged to be moved into the liner by power means, so as to heat and thereby soften the liner to a blowing consistency. Control means are provided to actuate and coordinate the first and second evacuating means and the heater to prevent premature expansion of the liner. The first and second evacuating means are actuated so that a vacuum is produced in both spaces, within the liner, and between the liner and the filler. Fluid pressure is then admitted to the space within the liner to expand the softened liner into the filler. The liner is allowed to cool, and the action of the first evacuating means is terminated.

Further objects, advantages and features of the present invention will appear from the following description, taken with the accompanying drawings, in which:

FIG. 1 is a somewhat diagrammatic elevational view of a machine for producing plastic lined vacuum bottle fillers.

FIG. 2 is an elevational view, partly in section of a plastic blank which is adapted to be expanded into the vacuum bottle filler to form a liner therein.

FIG. 3 is an elevational section showing the plastic blank in place on the head of the illustrative machine of FIG. 1.

FIG. 4 is a view similar to FIG. 3 but showing the addition of the filler and the insertion of the heater for softening the plastic blank.

FIG. 5 is a fragmentary view similar to FIG. 5 but showing the expansion of the plastic blank to form the desired liner.

FIG. 6 is an enlarged fragmentary elevational view showing details of the neck of the liner.

FIG. 7 is a cross sectional view showing the liner and the filler before expansion of the liner.

FIG. 8 is a cross sectional view showing the filler and the liner after the expansion of the liner into the filler.

FIG. 9 is a block diagram showing the control system of the illustrative machine shown in FIG. 1.

FIG. 10 is a fragmentary diagrammatic sectional view illustrating a modified method of making plastic lined fillers in accordance with the present invention.

As already indicated, the present invention relates to the production or manufacture of a vacuum bottle filler 1 which is provided with a protective liner 2 made of plastic or other similar material. The illustrated filler 1 is of the usual type having inner and outer walls 3 and 4 with an evacuated space 5 therebetween, to provide vacuum insulation. Normally, the filler 1 is made of glass. The present invention relates particularly to the formation of a liner in the filler of the illustrated type having a reduced neck or mouth 6, so that the side wall or body 7 of the liner is substantially larger in diameter than the inside of the neck 6. Because of the larger diameter of the side wall 7, it is not feasible simply to insert the liner through the smaller neck 6. It is advantageous to employ a filler having a reduced neck or mouth, because the reduction in the size of the mouth reduces the transfer of heat through the stopper or other closure which is employed to close the mouth of the filler. Moreover, it is generally easier to provide a fluid-tight closure for a filler having a mouth of reduced size.

The plastic liner 2 protects the vacuum insulated filler from being scratched, damaged or broken from the inside. Such protection is desirable, because the filler is made of thin glass and is quite fragile. Due to the formation of the vacuum in the space 5 between the walls 3 and 4, the thin walls are subjected to a considerable stress due to atmospheric pressure. This stress increases the fragility of the filler. It has been found that unlined vacuum bottle fillers are often broken from the inside, due to the insertion of spoons or other utensils into the filler, and due to the use of ice cubes in the filler. The present invention is particularly advantageous for use with fillers having wide enough mouths or necks to permit the insertion of a spoon into the filler. Such widemouthed fillers are widely used for holding hot soup and other foods containing solid material which may be eaten with a spoon. If a spoon is inserted into an unlined filler, the filler may be accidentally broken or scratched. The provision of the plastic liner 2 prevents the scratching or breakage of the filler from within.

In accordance with the present invention, the plastic liner 2 is preferably formed initially as a plastic blank 8, shown to best advantage in FIG. 2. It will be seen that the liner blank 8 is in the form of a plastic receptacle which is small enough in diameter to be inserted through the mouth 6 of the filler 1. The illustrated blank 8 has a side wall 9 and a bottom wall 10. As shown, the side wall 9 is generally cylindrical in shape but tapers downwardly to some extent to facilitate the removal of the blank 8 from the mold in which it is formed. The blank 8 may be formed by injection molding or by any other known or suitable method of forming plastic materials. The blank 8 may be made of various suitable plastic materials, such as polypropylene or polyethylene, for example.

At the upper end of the side wall 9, the illustrated blank 8 is formed with an outwardly flaring lip or flange 11 adapted to extend over the top of the glass filler 1. As in the usual case, the illustrated filler 1 has a curving top wall portion 12 which extends between the inner and outer walls 3 and 4. The under side of the flange or lip 11 is curved to conform generally to the curvature of the upper wall portion 12 of the filler 1. However, elements 13 are formed on the under side of the lip 11 to prevent the formation of a tight seal between the lip 11 and the upper wall portion 12 of the filler. As will be described in greater detail shortly, the elements 13 facilitate the operation of evacuating the space between the liner blank 8 and the inside of the filler 1. The elements 13 may take the form of channels or other formations, but are illustrated as ridges or ribs which are raised with respect to the surrounding surface of the lip so that channels are effectively provided between the lip and the upper wall portion 12 of the filler. It will be seen from FIGS. 2 and 6 that the ridges or ribs 13 extend along the under side of the lip 11 and also downwardly along the outside of the side wall 9 at the upper end thereof.

In carrying out the preferred method of the present invention, the liner blank 8 is slipped into the filler 1 until the upper end portion 12 of the filler engages the lip 11. The space between the outside of the liner blank 8 and the inside of the filler 1 is then evacuated so that there will be no air in this space to form bubbles or air pockets when the liner blank is expanded into the filler. In order to make it possible to expand the liner blank 8 by a blowing operation, the liner blank is heated until it is softened to a consistency suitable for blowing. To prevent premature expansion of the liner blank 8 by atmospheric pressure within the liner blank, the space within the liner blank is preferably evacuated before the liner blank has been heated sufficiently to soften it to any substantial extent.

When the liner blank has been softened to the desired consistency for blowing, fluid pressure is applied to the inside of the liner blank so as to blow the liner blank outwardly into close proximity to the entire inside of the filler 1. Most conveniently, the fluid pressure is applied to the inside of the liner blank simply by venting the space within the liner blank to the atmosphere so as to admit atmospheric pressure thereto. In view of the continuing vacuum between the liner blank and the inside of the filler, the atmospheric pressure is sufficient to expand the liner blank to the fullest possible extent so that the liner blank engages the entire inside of the filler.

After the liner blank has thus been fully expanded to provide the desired liner 2, the liner is cooled until it is hard enough to hold its new shape. The vacuum between the liner and the filler may then be vented. If desired, a suitable sealing compound 14 may be employed to seal the joint between the top portion 12 of the filler and the under side of the lip 11. Such sealing compound 14 may take the form of a plastic composition which may be poured in the molten state into the joint. Various other measures may be taken to seal the joint, if desired.

FIG. 1 illustrates a machine 15 which may advantageously be employed to expand the plastic liner blank 8 into the filler 1. Various details of the machine are shown in FIGS. 2-5. Thus, the illustrated machine 15 is provided with a holder or head 16 for receiving the liner blank 8 and the filler 1. The head 16 is formed with an upwardly opening bore 17 into which the liner blank 8 may be inserted, with the liner blank in an inverted position, as shown in FIG. 3. The diameter of the bore 17 corresponds generally to the diameter of the lip or flange 11 on the liner blank. At the lower end of the bore 17, the head 16 is formed with an internal shoulder 18 adapted to support the lip 11 of the liner blank. One or more sealing rings 19 may be mounted in the head 16 to form a fluid tight seal between the shoulder 18 and the lip 11 of the liner blank.

The filler 1 is placed on the head 16 in an inverted position over the liner blank 8. It will be seen that the outer side of the neck 6 of the filler is adapted to be received in the bore 17. Another sealing ring 20 is provided in the head 16 to form a seal between the outside of the filler 1 and the inside of the bore 17, at a point above the lip 11 on the liner blank 8.

The machine 15 is provided with a heater 21 for heating the plastic liner blank 8. It will be seen that the heater 21 is adapted to be moved upwardly through the head 16 and into the liner blank 8. The heater 21 is movable through a bore 22 formed in the lower portion of the head 16. The bore 22 is of a reduced diameter with respect to the bore 17. The heater 21 preferably takes the form of an elongated heater element which is electrically energized. The heater 21 is shaped and constructed so as to heat all portions of the liner blank 8 to the desired extent, so that the liner blank can be uniformly expanded into the filler.

In this case, the electric heater 21 is mounted on the upper end of a rod or plunger 23 which is adapted to be raised and lowered by suitable power means. Such power means preferably take the form of an air cylinder 24.

The head 16 is preferably arranged so that it is rotatable during the heating operation so that the liner blank 8 will be uniformly heated by the electric heater 21. Thus, the head 16 is rotatably mounted in a bearing or sleeve 23. The lower portion of the illustrated head 16 is formed with a cylindrical outer surface 26 which is rotatably received within a cylindrical bore 27 in the bearing 25. It will be seen that the lower end of the bearing 25 is formed with an inwardly projecting annular shoulder or flange 28 extending under the lower end surface 29 of the head 16. At its upper end, the bearing 25 has a flat upper surface 30 which engages and supports an annular shoulder 31 on the upper portion of the head 16.

Power means are preferably provided to rotate the head 16 so that the liner blank 8 and the filler 1 will be rotated while the liner blank is being heated by the electric heater 21. It will be seen that a ring gear 32 is secured around the outside of the head 16 and is adapted to be driven by a pinion 33 (FIG. 1). In this case, a chain 34 is employed to drive a rotatable shaft 34 which is connected to the pinion 33 by a gear box 35a. The chain 34 is threaded around a sprocket 36 secured to the shaft 35. The chain 34 extends around a second sprocket 37 on the shaft 38 of an electric motor 39.

As shown in FIGS. 3-5, the flange or shoulder 28 at the lower end of the bearing 25 is formed with an opening or bore 40 through which the electric heater 21 is movable into and out of the liner blank 8. When the heater 21 is moved upwardly, as shown in FIGS. 4 and 5, the opening or bore 40 is closed and sealed by a plug or stopper 41 which is secured to the shaft or rod 23 on which the heater 21 is mounted. The plug 41 is frusto-conical in shape and is tapered upwardly so that it makes a tight seal when it is moved upwardly into the opening 40. While the head 16 is rotatable, the heater 21, rod 23 and plug 41 are not rotated. The bearing 25 is also stationary.

The machine 15 is arranged to provide for evacuation of the space between the outside of the liner blank 8 and the inside of the filler 1. Provision is also made for separately evacuating the space within the liner blank 8. As shown in FIGS. 2-5, a passage 42 is formed in the head 16 to provide for the evacuation of the space between the liner blank 8 and the filler 1. One end of the passage 42 connects with an annular groove or port 43 which is formed in the inside of the head 16 opposite the position normally occupied by the neck portion of the filler 1. The groove 43 is positioned between the sealing ring 20 for the filler 1 and the sealing rings 19 for the lip 11 of the liner blank 8. Thus, the groove 43 communicates with the joint or opening between the rounded end portion 12 of the filler 1 and the lip or flange 11 on the liner blank 8.

It will be seen that the passage 42 extends downwardly within the head 16 and communicates at its lower end with an outwardly directed port 44 in the cylindrical lower portion 26 of the head. The port 44 registers with an annular groove 45 which is formed in the internal cylindrical surface 27 in the bearing 25. The groove 45 communicates with a threaded opening 46 in the bearing 25. The opening 46 is adapted to receive a pipe or conduit 47 through which the space between the liner blank 8 and the filler 1 is evacuated.

As shown in FIG. 9, the machine 15 is provided with a vacuum pump 48. A control valve 49 is connected between the pipe 47 and the vacuum line 50 leading to the pump 48. The valve 49 may be of the three-way type and may also have a connection to a vent 51 leading to the atmosphere. In one of its two positions, the valve 49 connects the pipe 47 to the vacuum line 50. In the other position of the valve 49, the pipe 47 is connected to the vent 51 and thence to the atmosphere. A solenoid 52 may be provided to operate the valve 49.

The head 16 is formed with another passage 53 to provide for evacuation of the space within the liner blank 8. One end of the passage 53 communicates with a port 54 opening into the space within the head 16 and in communication with the interior of the liner blank 8. The port 54 is located between the plug 41 and the sealing rings 19 for the flange 11 of the liner blank. At its opposite end, the passage 53 communicates with another port 55 formed in the cylindrical outer surface 26 on the lower end of the head 16. The port 55 registers with an internal annular groove 56 formed in the bearing 25. The groove 56 communicates with a threaded opening 57 adapted to receive a pipe or conduit 58, through which the interior of the liner blank 8 is evacuated.

As shown in FIG. 9, a control valve 59 is connected between the pipe 58 and the vacuum line 50 leading to the vacuum pump 48. The valve 59 is similar to the valve 49. When the valve 59 is in one of its two positions, the pipe 58 is connected to the vacuum line 50. In the other position of the valve 59, the pipe 58 is connected to a vent 60 leading to the atmosphere. A solenoid 61 is provided to operate the valve 59.

The machine 15 is provided with means for sealing the rotary joint between the ports 44 and 55 in the rotatable head 16 and the grooves 45 and 56 in the stationary bearing 25. As shown in FIGS. 2–5, such sealing means comprise three sealing rings 62, 63 and 64 which are mounted in the bearing 25 and are in engagement with the cylindrical lower portion 26 of the head 16. The rings 62 and 63 are above and below the groove 45. The rings 63 and 64 are above the groove 56. The rings 62–64 form effective rotary seals between the rotatable head 16 and the stationary bearing 25.

The various operations of the machine 15 are preferably controlled by a timer 65 which carries out the operating cycle of the machine. Electrical power is supplied to the timer by a power line 66. Electrical connections 67 and 68 are provided between the timer 65 and the solenoids 52 and 61 of the vacuum control valves 49 and 59. An electrical connection 69 is also provided between the timer 65 and the motor 39 which rotates the head 16.

The air cylinder 24 may be controlled by a four-way valve 70 having an operating solenoid 71. An electrical connection 72 is provided between the timer 65 and the solenoid 71. Compressed air is supplied to the valve 70 by an air compressor 73 through an air line 74. Feeder lines 75 and 76 extend between the valve 70 and the opposite ends of the air cylinder 24. The valve 70 is also connected to a vent 77 leading to the atmosphere. In one position of the valve 70, the air line 74 is connected to the line 75 leading to the lower end of the air cylinder 24, so that the air cylinder is operative to raise the electric heater 21 into the liner blank 8. In this position of the valve 70 the line 76 is connected to the vent 77. In the other position of the valve 70, the connections are reversed, so that the air line 74 is connected to the line 76 leading to the upper end of the air cylinder 24. The other line 75 is connected to the vent 77.

The electric heater 21 may be energized through an electrical connection 78 connected to the power line 66 through a switch 79. Normally, the electrical heater 21 may be energized at all times while the machine is in operation. However, if desired, the heater 21 may be connected to the timer 65 for energization during only a portion of the cycle of the machine.

Before each cycle of the machine 15, a new liner blank 8 and a new filler 1 are mounted on the head 16. The timer 65 is then started. The construction of the timer may be such that it immediately energizes the motor 39 so as to rotate the head 16. Next, the timer 65 energizes the solenoid 52 of the valve 49 so that the vacuum pump 48 will begin to evacuate the space between the liner blank and the filler. The timer then energizes the valve solenoid 71 so as to cause the air cylinder 24 to raise the electric heater 21 into the liner blank 8. When the heater is raised, the plug 41 closes the opening 40 in the lower end of the bearing 25 so that it is possible to evacuate the interior of the liner blank. The timer 65 then energizes the solenoid 61 of the valve 59 so that the vacuum pump 48 will begin evacuating the space within the liner blank 8. The steps of operating the valve 49 for the outer vacuum, raising the heater 21, and operating the valve 59 for the inner vacuum may be almost simultaneous. The outer and inner vacuums are maintained for the time interval which is necessary to heat the liner blank 8 to a soft consistency suitable for blowing.

When the liner blank 8 has been heated for a sufficient time, the timer 65 reverses the valve 59 and thereby vents the interior of the liner blank to the atmosphere. The pressure of the atmosphere expands the blank outwardly into close proximity with the entire inside of the filler 1. At this point, the timer 65 reverses the air valve 70 so as to cause the air cylinder 24 to move the electric heater 21 downwardly out of the newly formed liner. The filler 1 and the liner 2 are then allowed to cool for a sufficient time interval to cause the liner to harden so that it will maintain its shape. The timer then reverses the valve 49 to vent the outer vacuum. At this point, the timer may also stop the motor 39 so that the completed filler 1 may be conveniently removed from the head 16. This represents the end of the complete operating cycle of the machine 15.

The illustrated machine 15 employs natural cooling to cool the filler and the newly expanded liner. However, forced cooling may be employed by providing means to blow cool air into the lined filler, or by cooling the filler in some other suitable manner.

Various modifications may be made in the apparatus of the present invention. Thus, for example, the liner blank 8 may be preheated, before the liner blank is inserted into the filler. The preheating of the liner blank makes it possible to reduce the time required to expand the plastic liner blank into the filler. FIG. 10 illustrates one such modification in which the liner blank is expanded while it is still hot from the injection molding operation by which it was initially formed. Thus, in FIG. 10, the liner blank 8 is mounted around the mold core 80 employed in the injection molding operation. After the injection molding operation has been completed, the plastic blank 8 is cooled only to the extent necessary to permit it to be removed from the injection mold. However, the blank 8 remains on the mold core 80. At this stage, the blank 8 is still hot enough to permit the expansion of the blank by a blowing operation. The mold core 80 may have one or more passages 81 therein through which fluids may be circulated to control the temperature of the mold core.

As shown in FIG. 10, the mold core 80 is received within a head or sleeve 82. A sealing ring 83 is provided between the head 82 and the mold core 80. The head 82 has an upper portion 84 with a bore 85 therein adapted to receive the neck portion of the filler 1, with the filler in an inverted position. A sealing ring 86 is provided to form a seal between the bore 85 and the outside of the filler 1. In this way, the space between the filler 1 and the liner blank 8 can be evacuated. For this purpose, a pipe or conduit 87 is connected to an opening 88 in the head 82. A passage 89 extends between the opening 88 and the space within the head 82 opposite the point between the filler and the liner blank. The vacuum control valve 49 of FIG. 9 may be connected to the pipe 87, so as to control the evacuation of the space between the liner blank 8 and the filler 1. A pipe 89 may be connected between the other vacuum control valve 59 and a passage 90 in the mold core 80. The passage 90 has one or more portions 91 which extend to the outside of the mold core 80 and thus are in communication with the inside of the liner blank 8.

In accordance with the modification illustrated in FIG. 10, the filler 1 is placed over the liner blank 8 as soon as the liner blank is removed from the injection mold, but while the liner blank is still on the mold core 80. At this stage, the liner blank is still hot and is soft enough to be blown. The valves 49 and 59 are actuated so as to evacuate not only the space between the liner blank 8 and the filler 1, but also the space within the liner blank 8. The evacuation of the space between the liner blank 8 and the filler obviates any possibility that air pockets or bubbles may be formed between the liner blank and the filler when the liner blank is expanded. The evacuation of the space within the liner blank 8 prevents immediate or premature expansion of the liner blank. It is desirable to defer the expansion of the liner blank until a high degree of evacuation has been achieved in the space between the liner blank and the filler. Fluid pressure may then be admitted to the interior of the liner blank 8 so as to expand the liner blank in a uniform manner into engagement with the entire inner surface of the filler 1. Such fluid pressure may simply comprise normal atmospheric pressure which may be admitted to the liner blank 8 by reversing the valve 59 so as to vent the passage 90 to the atmosphere. When the liner blank has been expanded, it is allowed to cool until it will hold its shape. Then, the finished filler 1 is removed from the mold core 80. The cooling of the liner blank may be hastened by circulating a cooling fluid through the passage 81.

After the filler has been removed, the mold core 80 may be returned to the injection mold for use in the molding of another liner blank. It may be desirable to provide a plurality of mold cores for each mold so that the idle time of the mold may be minimized. Thus, one mold core may be used in the injection mold while another mold core is being used in connection with the expansion of a previously molded plastic blank.

As described herein, the evacuation of the space between the plastic liner blank and the filler prevents the formation of any air pockets or bubbles when the liner blank is expanded into the filler. It is also preferred to evacuate the space within the liner blank to prevent the premature expansion of the liner blank by atmospheric pressure within the blank. If the liner blank is allowed to expand prematurely, some air may still be present in the space between the liner blank and the filler. Such remaining air will produce air pockets or bubbles between the liner and the filler. Moreover, if expansion of the liner is permitted before the liner blank has been sufficiently heated, the expansion of the blank may be quite uneven so that the wall thickness of the expanded liner may vary considerably from point to point. The initial evacuation of the space within the liner blank makes it possible to defer the expansion of the liner blank until the blank has been heated to the correct degree of softness for the blowing operation. Then, when fluid pressure is admitted to the interior of the liner blank, the expansion of the blank is carried out in a uniform manner so that the wall thickness of the liner will be uniform. This procedure greatly improves the durability, strength and appearance of the liner.

Various other modifications, alternative constructions and equivalents may be employed without departing from the true spirit and scope of the invention, as exemplified in the foregoing description and defined in the following claims.

We claim:

1. A machine for expanding a plastic liner into a vacuum bottle filler having a reduced neck,
said machine comprising a rotatable head for receiving the liner,
the filler being receivable over the liner,
power means for rotating said head,
first evacuating means for evacuating the space between the liner and the filler,
said first evacuating means including first passage means in said head,
second evacuating means for evacuating the space within the liner,
said second evacuating means including second passage means in said head,
a heater movable through said head into the liner,
said head having an opening therein for receiving said heater,
power means for advancing said heater into the liner,
and control means for actuating said first and second evacuating means and said heater during intervals which overlap at least in part so as to prevent premature expansion of the liner as it is heated by said heater,
said control means being operative to terminate the action of said second evacuating means while the action of said first evacuating means is continued whereby atmospheric pressure will expand the heated liner into the filler,
said control means being operative to terminate the action of said heater while the liner cools sufficiently to maintain its shape,
said control means thereupon being operative to terminate the action of said first evacuating means.

2. A machine for expanding a plastic liner into a vacuum bottle filler having a reduced neck,
said machine comprising a rotatable head for receiving the liner,
the filler being receivable over the liner,
first power means for rotating said head,
a heater movable through said head into the liner,
said head having an opening therein for receiving said heater,
second power means for advancing and retracting said heater into and out of the liner,
first evacuating means for evacuating the space between the liner and the filler,
said first evacuating means including first passage means in said head,
second evacuating means for evacuating the space within the liner,
said second evacuating means including second passage means in said head,
and control means for successively actuating said second power means to advance said heater into the liner, actuating said first and second evacuating means to prevent premature expansion of the liner, terminating the actuation of said second evacuating means whereby the liner will be expanded into the filler by atmospheric pressure, actuating said second power means to withdraw said heater from the liner so that the liner will cool sufficiently to maintain its shape, and terminating the action of said first evacuating means.

3. A machine according to claim 2, including means operable by advancing movement of said heater for closing said opening in said head.

4. A machine according to claim 2, including a member connected to said heater and movable therewith for closing said opening in said head when said heater is advanced into the liner, said member being effective to open said opening when said heater is retracted out of the liner.

5. A machine for expanding a plastic liner into a vacuum bottle filler having a reduced neck, said machine comprising a rotatable head for receiving the liner in an inverted position, the filler being receivable over the liner, power means for rotating said head, first evacuating means for evacuating the space between the liner and the filler, said first evacuating means including first passage means in said head, second evacuating means for evacuating the space within the liner, said second evacuating means including second passage means in said head, a heater movable through said head into the liner, power means for advancing said heater into the liner, control means for actuating said first and second evacuating means and said heater during intervals which overlap at least in part so as to prevent premature expansion of the liner as it is heated by said heater, said control means being operative to terminate the action of said second evacuating means while the action of said first evacuating means is continued whereby atmospheric pressure will expand the heated liner into the filler, said control means being operative to terminate the action of said heater while the liner cools sufficiently to maintain its shape, said control means thereupon being operative to terminate the action of said first evacuating means.

References Cited

UNITED STATES PATENTS

| | | |
|---|---|---|
| 2,805,787 | 9/1957 | Sherman. |
| 2,898,972 | 8/1959 | Strong. |
| 3,103,036 | 9/1963 | Nave et al. |

FOREIGN PATENTS

| | | |
|---|---|---|
| 1,016,415 | 10/1952 | France. |
| 453,123 | 9/1936 | Great Britain. |

WILBUR L. McBAY, *Primary Examiner.*